United States Patent [19]

Finsterwalder et al.

[11] 4,368,702
[45] Jan. 18, 1983

[54] METHOD OF OPERATING AN AIR-COMPRESSING, SELF-IGNITING INTERNAL COMBUSTION ENGINE

[75] Inventors: Gerhard Finsterwalder, Bergisch-Gladbach; Jakob Saftig, Cologne, both of Fed. Rep. of Germany

[73] Assignee: Klöckner-Humboldt-Deutz Aktiengesellschaft, Cologne, Fed. Rep. of Germany

[21] Appl. No.: 110,709

[22] Filed: Jan. 9, 1980

[30] Foreign Application Priority Data

Jan. 13, 1979 [DE] Fed. Rep. of Germany ....... 2901210

[51] Int. Cl.³ .......................... F02N 17/08; F02B 3/06
[52] U.S. Cl. ................................... 123/261; 123/1 A; 123/276; 123/299
[58] Field of Search ............... 123/1 A, 261, 262, 263, 123/276, 299, 300, 301, 304

[56] References Cited

U.S. PATENT DOCUMENTS

| | | | |
|---|---|---|---|
| 747,620 | 12/1903 | Low et al. | 123/304 X |
| 1,419,231 | 6/1922 | Crossley et al. | 123/304 |
| 1,767,701 | 6/1930 | Riehm | 123/143 R X |
| 1,962,283 | 6/1934 | Nordberg | 123/304 |
| 2,692,587 | 10/1954 | Barber | 123/304 |
| 2,741,230 | 4/1956 | Reynolds | 123/304 |
| 2,777,430 | 1/1957 | Meorer | 123/276 X |
| 2,837,067 | 6/1958 | Meurer | 123/276 |
| 3,999,532 | 12/1976 | Kornhauser | 123/263 |
| 4,254,741 | 3/1981 | Werling et al. | 123/1 A |
| 4,273,084 | 6/1981 | Holmer | 123/276 X |

FOREIGN PATENT DOCUMENTS 470821 4/1952 Italy ..................................... 123/299

*Primary Examiner*—Tony M. Argenbright
*Attorney, Agent, or Firm*—Becker & Becker

[57] ABSTRACT

A method and apparatus for operating an air-compressing, self-igniting combustion machine or engine, for liquid fuels, which has a combustion chamber depression, in the piston, into which fuel is sprayed or injected essentially centrally, preferably in a direction toward the depression wall, and in which the combustion air rotates at the time of injection. Oxygen-containing fuel that is reluctant to ignite is injected through an injection device into the combustion chamber depression, and an ignitible fuel is sprayed or injected through a second injection device, with an overlap in the injection times of the ignitible fuel and the oxygen-containing fuel that is reluctant to ignite. Ignition of the oil fuel, gas oil or Diesel fuel starts before injection of the oxygen-containing fuel that is reluctant to ignite. After approximately ⅔ of the injection time of the Diesel fuel, there begins the injection of the oxygen-containing fuel which is reluctant to ignite. During cold starting, only Diesel fuel is injected in a quantity sufficient for cold starting, until attaining a low idling speed. The volume ratio of Diesel fuel to the oxygen-containing fuel reluctant to ignite is approximately 1:30 at full load. The injection devices for the two fuels may be embodied in a single nozzle body.

6 Claims, 4 Drawing Figures

METHOD OF OPERATING AN AIR-COMPRESSING, SELF-IGNITING INTERNAL COMBUSTION ENGINE

The present invention relates to a method of operating an air-compressing, self-igniting internal combustion engine, for liquid fuels, which has a combustion chamber depression or hollow portion in a piston thereof, into which depression the fuel is injected or sprayed essentially centrally, preferably in a direction onto the depression wall, and in which the combustion air rotates at the injection point of time or moment. The present invention also relates to an apparatus for carrying out this method.

Efforts are under way to replace oil with synthetically producible fuels and additionally to improve the exhaust gas quality of present day Diesel motors because of the expected oil shortage and price increases.

An object of the present invention accordingly is to provide a method for operation of an internal combustion engine of the aforementioned type, and also to provide an apparatus for carrying out such a method, according to which the previously utilized petroleum products can be extensively replaced as fuel, accompanied by an improvement of the exhaust gas quality.

These objects and other objects and advantages of the present invention will appear more clearly from the following specification in connection with the accompanying drawings, in which:

FIG. 1b is a plan view of the piston of FIG. 1a;

FIG. 2b is a plan view of the piston illustrated in FIG. 2a.

Figure 1A:
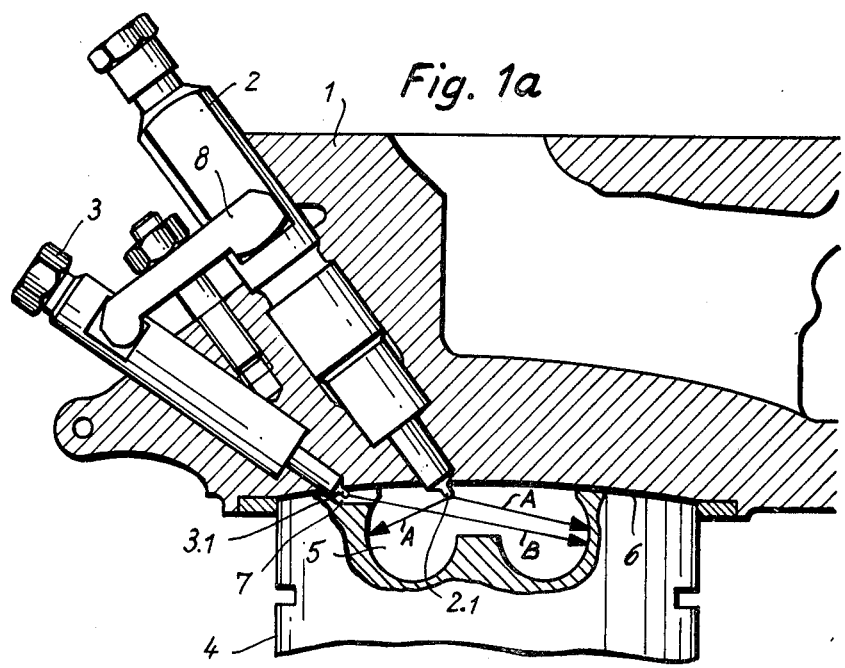
FIG. 1a shows a section through a cylinder head with a piston of one embodiment of the present invention.

The method of the present invention is characterized primarily in that, by way of an injection device, unwilling or reluctant to ignite, oxygen-containing fuel is injected or sprayed into the combustion chamber depression, that, by way of a second injection device, ignitible fuel is injected or sprayed into the combustion chamber depression for initiating or bringing about and/or maintaining the combustion, and furthermore that the injection times of the ignitible fuel and reluctant to ignite, oxygen-containing fuel overlap each other. Oil fuel, gas oil or Diesel fuel is preferably used as the fuel which is ignitible. It is, however, also possible to use n-heptane, or fuel that is reluctant to be ignited, for instance methanol, and made ignitible or more willing to be ignited by the addition of ignition accelerators, for instance "Kerobrisol". Especially suitable according to this method as an oxygen-containing fuel unwilling to ignite is methanol, and likewise higher alcohols and ethanol as well as mixtures thereof.

Tests have proven that the present inventive method is very insensitive with respect to the quality of the fuel containing oxygen and unwilling to ignite. For this reason, it is possible that the oxygen-containing fuel which is unwilling to ignite, in spite of a contamination amounting to 30% by volume, for instance by way of water, ignites with certainty and combusts or burns completely. Also, liquid petroleum gas or liquid bottle motor fuel (such as propane, butane) can be used in place of an oxygen-containing fuel.

German Offenlegungsschrift No. 27 49 806 discloses a method for operation of a Diesel motor with admixing of methanol to the suction air. In this connection, in contrast to the present invention, the methanol-air mixture is compressed in the cylinder, and oil fuel, gas oil, or Diesel fuel is sprayed into the compressed mixture for starting the ignition. With this embodiment, only small methanol quantities can be added, since otherwise at full load knocking, and at partial load exceeding of the limit of cutting out or stopping of ignition, is encountered. Additionally, in the partial load range, the fuel consumption and the carbon monoxide, hydrocarbon and aldehyde emissions rise considerably. Also, the suggested prewarming of the suctioned air and/or the utilization of ignition accelerators is not sufficient to avoid these disadvantages.

With the present inventive method, in contrast, the combustion is started or initiated during the Diesel method or procedure by injection of spraying-in of oil fuel, gas oil or Diesel fuel as an ignition oil into the compressed air. Simultaneously with or after the injection of the Diesel fuel, the oxygen-containing fuel that is unwilling to ignite is injected or sprayed-in and is "externally ignited" with the ignition-oil flame. The inventive method accordingly is based upon the concept that for combusting or burning an oxygen-containing fuel that is unwilling to be ignited in a Diesel engine, it is especially advantageous to start or initiate the combustion or burning by self-ignition of the Diesel fuel according to the Diesel method or procedure, and thereupon to ignite the oxygen-containing fuel that is reluctant to be ignited.

By the present inventive method, it is possible, with sure ignition and with combustion which is low as to noxious materials, to replace up to 95% by volume of the oil fuel, gas oil or Diesel fuel with oxygen-containing fuel that is reluctant or unwilling to ignite. With the inventive method, the hydrocarbon emission is lowered below values which are conventional with Diesel motors. Likewise, no black smoke occurs.

Tests have shown that it is advantageous to inject or spray in the oxygen-containing fuel that is unwilling to ignite after the spraying-in or injection of the Diesel fuel, especially after approximately $\frac{2}{3}$ of the injection time of the Diesel fuel.

With the combustion machines or engines operating according to the inventive method, it has been found that it is sufficient for sure ignition to maintain constant the quantity of Diesel fuel during the entire operation, with the exception of the starting procedure, and only to vary the injection quantity of the oxygen-containing fuel that is unwilling to ignite, with such variation occurring as a function of load and/or speed. To cold start the combustion engine, it is advantageous to only inject or spray-in Diesel fuel in a quantity necessary for the cold starting. Only upon reaching the low idling speed should injection or spraying-in of the reluctant to ignite, oxygen-containing fuel occur. With a single-cylinder test motor having a stroke of 130 mm and a bore of 125 mm, a gas oil, oil fuel or Diesel fuel quantity of 40 cubic millimeters ($mm^3$) was used for a cold start, and in normal operation a gas oil, oil fuel or Diesel fuel quantity of 10 $mm^3$ was used per working cycle or per cycle of operation. At full load, the volume ratio of Diesel fuel to reluctant to ignite fuel is about 1:30.

The apparatus for carrying out this method is characterized primarily by a second injection nozzle per cylinder, with the first injection nozzle being provided for the oxygen-containing fuel that is unwilling to ignite, and the second injection nozzle being provided for the oil fuel, gas oil or Diesel fuel; furthermore, the injection time of oil fuel, gas oil or Diesel fuel and the injection time of the oxygen-containing fuel that is unwilling to ignite overlap each other.

It has been found sufficient for initiating the combustion or burning that the Diesel fuel be fed or supplied through an injection nozzle embodied for at least one stream. In this connection, it is especially advantageous that oil fuel, gas oil or Diesel fuel be sprayed or injected into the regions of the combustion chamber in which no oxygen-containing fuel that is unwilling to ignite is injected or sprayed. Consequently, during simultaneous injection or spraying of both fuels, it is hindered or precluded that the Diesel fuel is cooled too greatly by the heat of vaporization of the oxygen-containing fuel that is unwilling to ignite and then a self-ignition no longer occurs.

A further embodiment of the present invention is to embody the second injection nozzle as a single-hole nozzle which injects or sprays from the edge region of the combustion chamber depression at a flat angle into the middle of the combustion chamber depression. An advantage is attained therewith in that the ignition oil injection nozzle lies in the region of lower cylinder head temperatures and consequently is endangered very little thermally, so that a carbonization is precluded and accordingly a clogging or obstruction of the opening cross section is precluded.

Another embodiment provides that the second injection nozzle for the ignition oil is arranged in the cylinder head externally of the combustion chamber depression. Under these circumstances, it is advantageous that a recess be provided from the edge of the combustion chamber depression in the cylinder up to the second injection nozzle. This embodiment offers the advantage of an even lower thermal loading of the injection nozzle for the oil fuel, gas oil or Diesel fuel.

It is advantageous for burning or combustion technological reasons if the hole axis of the second injection nozzle (ignition oil nozzle) crosses or intersects, and is spaced from, the axis or parallel which passes through the first injection nozzle and is parallel to the cylinder axis, with respect to the first injection nozzle in the combustion chamber depression. A further advantage of this embodiment, in connection with the recess, consists in that in the combustion chamber a great free stream length results.

If the combustion chamber depression has a necked-down or narrowed edge, as proposed with an advantageous further embodiment of the invention, it is hindered or precluded that the oxygen-containing fuel that is unwilling to ignite comes out of the depression to the cylinder tube or pipe and there washes away the lubricating oil film.

If the injection nozzles are installed or built into the cylinder head close to each other, it is also possible to fasten or secure the injection nozzles in the head with a common clamping shoe. This has the advantage of lower structural expense and complexity. Additionally, the structural possibility of the cylinder head is facilitated and made easier, and the cooling is not affected. Especially with air-cooled motors, the through-passage cross section of the cooling air and the cooling rib sur-facing are not reduced.

Because of the insensitivity of the method, especially as to variation of the beginning of injection, both injection pumps can be coupled torsionally rigidly with each other.

With air-cooled combustion engines, it is also advantageous for thermal aspects to arrange both injection nozzles upon the cooling air supply or feeding side of the cylinder head and, as seen in the direction of rotation of the rotating air, behind or after the inlet valve. In this connection, it has been proven especially advantageous if the second injection nozzle for the oil fuel, gas oil or Diesel fuel is located before the injection nozzle for the oxygen-containing fuel that is unwilling to ignite, as seen in the direction of approaching flow of the cooling air. This assures that the injection nozzle for the Diesel fuel is well cooled, and accordingly is protected against carbonization.

It is also possible to unify both injection nozzles in one nozzle body. This is especially appropriate with small cylinder heads, where installation of two injection nozzles is accompanied by problems of installation. A further advantage of this arrangement is recognizable therein that the nozzle body collectively is well cooled by the supplied oxygen-containing fuel that is unwilling to ignite.

Since with an arrangement of both nozzles in one nozzle body, the nozzle bores are arranged practically in the center of the combustion chamber depression, it is advantageous in this case to provide two nozzle openings for the ignition oil.

Referring now to the drawings in detail, in the cylinder head 1 illustrated partially in section in FIG. 1a, there are shown two injection nozzles 2 and 3 inclined to the cylinder axis. A piston 4 is indicated below the cylinder head 1 in its upper dead center position. An omega-formed combustion chamber depression 5 is provided therein. Neither the present inventive method nor the present inventive apparatus should be considered to be limited or restricted to this special form of the combustion chamber depression. The first injection nozzle 2, which is provided for the oxygen-containing fuel that is unwilling or reluctant to ignite, projects into the combustion chamber depression 5 with its jet or nozzle openings 2.1 in the upper dead center position. The fuel is injected or sprayed in multiple streams, in this example with four streams A, centrally into the depression in the direction toward the depression wall. It is practical that the combustion chamber depression 5 have a retracted or drawn-in edge. This hinders or precludes that the fuel can come out of the depression to the cylinder pipe or tube, and there wash away the lubricating oil film.

The second injection nozzle 3, which is provided for the oil fuel, gas oil or Diesel fuel, is embodied for a single stream in this example. The nozzle opening 3.1 of the injection nozzle 3 projects into the edge region of the combustion chamber depression 5. For this reason, a recess 7 is worked into the piston head or crown 6 from the nozzle opening 3.1 as far as to the combustion chamber edge. The second injection nozzle 3 is embodied and arranged in such a way that the extension of its nozzle hole axis intersects the axis parallel to the cylinder axis through the tip of the first injection nozzle 2 in the combustion chamber depression 5. Under these circumstances, a large, free stream length of the ignition oil stream is attained, which is advantageous for a uniform combustion or burning.

Both injection nozzles 2 and 3 are inclined in the cylinder head 1 and are arranged sequentially or in series one behind the other in such a way that the injection nozzles 2 and 3 can be fastened by a common clamping shoe or bracket 8. With air-cooled motors, the cooling-air feed or supply side is the most advantageous location for accommodation or installation of the nozzles, whereby it is expedient for thermal reasons to expose the second injection nozzle directly to the air. Furthermore, it is advantageous with the arrangement of the injection nozzles that the fresh air flowing into the combustion chamber passes along the ignition oil stream nozzle tip.

Figure 1B:
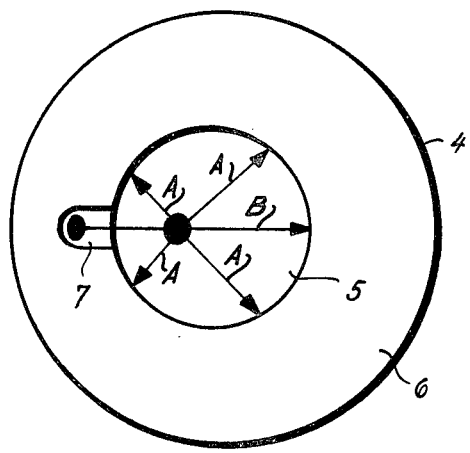
Figure 2A:
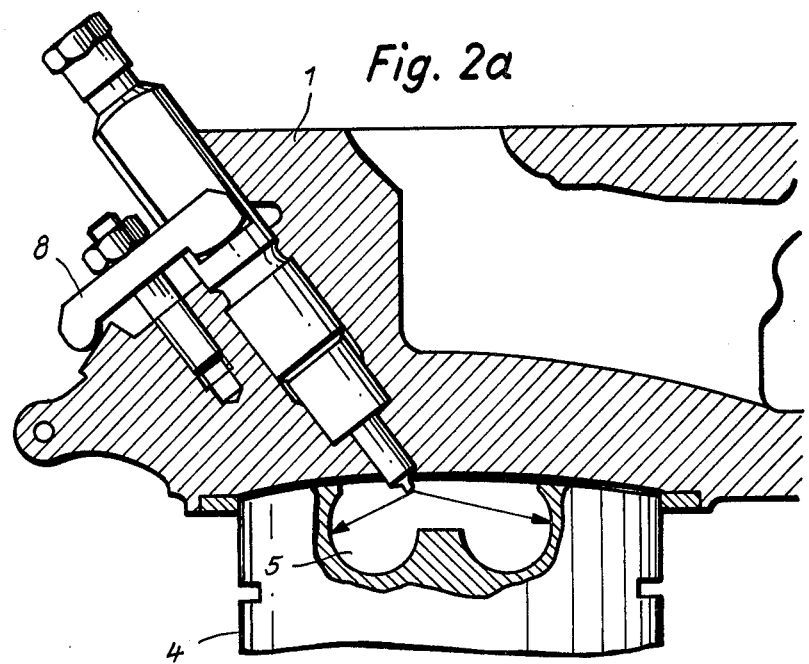
FIG. 2a is a section through a cylinder head with a double injection nozzle body according to another embodiment of the present invention.
Figure 2B:
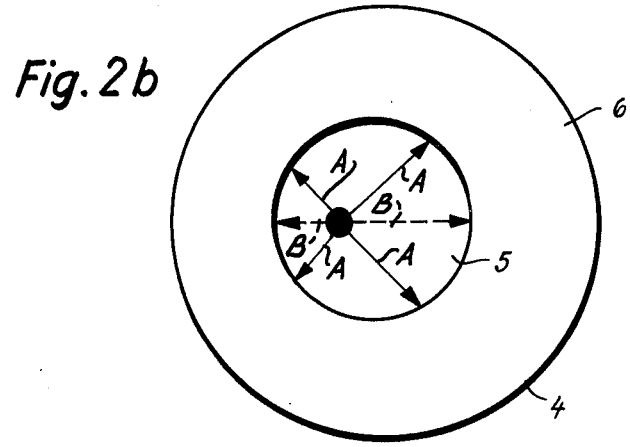

In a manner differing from that illustrated by FIGS. 1a and 1b, only a single nozzle body is illustrated in FIGS. 2a and 2b. This nozzle body is arranged like the first injection nozzle in FIG. 1a, only with the difference that it is arranged or embodied for both fuels. As shown by FIG. 2b, the oxygen-containing fuel that is unwilling or reluctant to ignite is sprayed from four nozzle openings onto the combustion chamber depression wall (see solid lines A). The oil fuel, gas oil or Diesel fuel is conveyed diametrically, between two streams of the oxygen-containing fuel that is unwilling to ignite, through two separate nozzle openings into the combustion chamber see dotted lines B. This embodiment has the advantage that no changes are necessary on the cylinder head, and accordingly motors already found in operation can be subsequently revised or modified by exchanging the injection nozzle.

The present invention is, of course, in no way restricted to the specific disclosure of the specification and drawings, but also encompasses any modifications within the scope of the appended claims.

What we claim is:

1. A method of operating an air compressing, self-igniting internal combustion engine for liquid fuels to burn primarily oxygen-containing liquid fuels which are reluctant to ignite soley due to compression in the engine, which engine has at least one cylinder with a piston therein the piston having a combustion chamber depression therein for receiving injected fuel and a rotating charge of air, the method comprising the steps of:

during each cycle of the engine, injecting a first, defined stream of diesel-cycle fuel in a path toward the wall of the combustion chamber wherein the fuel ignites upon compression in the engine reaching a predetermined level to subsequently ignite an oxygen containing fuel;

subsequent to starting injection of the diesel-cycle fuel, injecting a plurality of defined streams of said oxygen-containing fuel toward the wall of the depression along paths which do not intersect the path of the first stream to minimize cooling of the diesel-cycle fuel by the oxygen-containing fuel, the injection of diesel-cycle fuel being generally adjacent the center of the combustion chamber depression, and overlapping the injection of the diesel-cycle fuel with the injection of the oxygen-containing fuel, whereby ignition of the diesel-cycle fuel occurs first and subsequently causes ignition of the oxygen-containing fuel which ignition of the oxygen-containing fuel powers the engine while ignition of the diesel-cycle fuel merely serves to ignite the oxygen-containing fuel.

2. The method of claim 1 wherein approximately two-thirds of the diesel-cycle fuel injected during each cycle is injected before injecting the oxygen-containing fuel.

3. The method of claim 1 wherein the diesel-cycle fuel is injected from a location radially displaced from the location of the oxygen-containing fuel injection to provide a longer free stream length from the path assumed by the diesel-cycle fuel.

4. The method of claim 1 wherein the diesel-cycle fuel is injected at the same location the oxygen-containing fuel is injected.

5. The method of claim 1 wherein the ratio of diesel cycle fuel to oxygen containing fuel is approximately 1:30.

6. The method of claims 1, 2, 3, 4 or 5 wherein the diesel-cycle fuel is selected from the group consisting of n-heptane, oil fuel, gas oil and diesel fuel and wherein the oxygen-containing fuel is selected from the groups consisting of methanol, ethanol and a higher alcohol including up to 30% by volume of impurities.

* * * * *